United States Patent [19]

Minoda et al.

[11] Patent Number: 5,020,207
[45] Date of Patent: Jun. 4, 1991

[54] PROCESS FOR PRODUCING MAGNETIC HUB

[75] Inventors: Takeshi Minoda; Akira Todo; Toshio Kimura; Masayoshi Kurisu, all of Ichihara, Japan

[73] Assignee: Mitsui Petrochemical Industries, Ltd., Tokyo, Japan

[21] Appl. No.: 492,385

[22] Filed: Mar. 9, 1990

Related U.S. Application Data

[63] Continuation of Ser. No. 226,886, Aug. 1, 1988, abandoned.

[30] Foreign Application Priority Data

Jul. 31, 1987 [JP] Japan .................. 62-193087

[51] Int. Cl.$^5$ .................. B22C 9/28; B23P 19/04
[52] U.S. Cl. .................. 29/527.4; 29/469.5; 29/894.2; 29/DIG. 29; 264/272.15; 264/274; 369/270; 369/282
[58] Field of Search .................. 29/33 C, 469.5, 527.1, 29/527.3, 527.4, 894.36, 894.361, 894.362, DIG. 28, DIG. 29, DIG. 95, DIG. 105, 894.2; 264/272.15, 278; 360/135; 369/270, 282

[56] References Cited

U.S. PATENT DOCUMENTS 4,616,278 10/1986 Yamaguchi et al. .................. 360/135
4,785,444 11/1988 Nakane et al. .................. 360/135 X

FOREIGN PATENT DOCUMENTS 0192188 8/1986 European Pat. Off. .
0233644 8/1987 European Pat. Off. .
0240170 10/1987 European Pat. Off. .
3539645 5/1986 Fed. Rep. of Germany .
3734685 4/1988 Fed. Rep. of Germany .
3734670 6/1988 Fed. Rep. of Germany .

Primary Examiner—Timothy V. Eley
Assistant Examiner—Peter Dungba Vo
Attorney, Agent, or Firm—Sherman and Shalloway

[57] ABSTRACT

A process for producing a magnetic hub for an optical disc which is fixed to the spindle of a disc drive by means of a magnetic clamp system, which process comprises positioning and setting an annular metal plate composed of a ferromagnetic substance having burrs on one side thereof produced by punching in a mold and then injecting a resin into the mold.

4 Claims, 2 Drawing Sheets

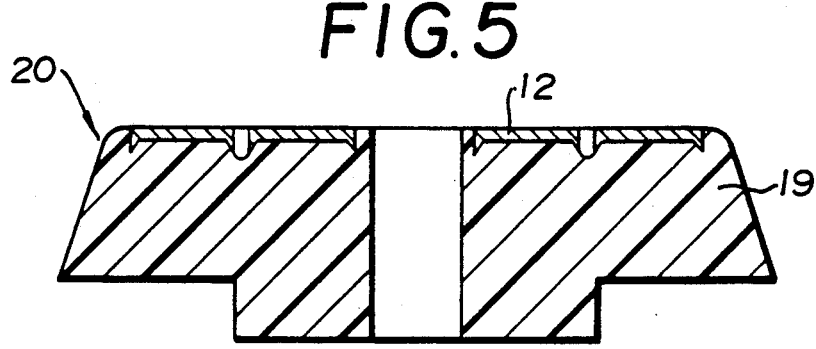
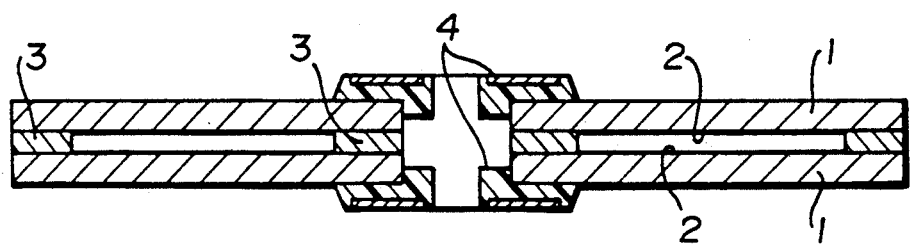
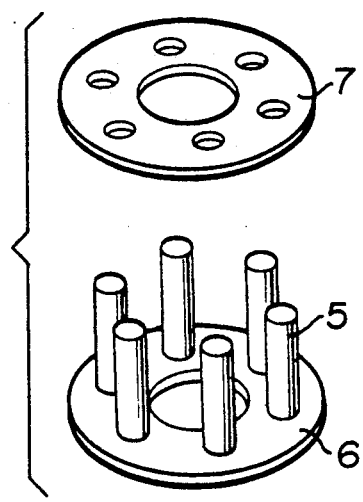

PROCESS FOR PRODUCING MAGNETIC HUB

This application is a continuation of application Ser. No. 07/226,886 filed Aug. 1, 1988, now abandoned.

FIELD OF THE INVENTION

The present invention relates to a process for producing a magnetic hub for optical disc in which the disc is fixed by a magnet clamp system.

BACKGROUND OF THE INVENTION

As a method for clamping an optical disc, there is a magnetic clamp system FIG. 6 shows an embodiment of an optical disc which is fixed by such a system. In FIG. 6, a pair of transparent substrates 1 made of a plastic are bonded to each other via a pair of spacers 3 in such a manner that recording films 2 are opposed to each other, magnet hubs 4 are fitted into an axle hole from upper and lower sides and the optical disc is inserted into the spindle of a disc drive at the time of use thereof and retained and fixed by means of a magnet fixed to the spindle.

Conventional methods for fixing the magnet hub include a method wherein an annular metal plate 6 composed of a ferromagnetic substance and provided with a plurality of connecting rods 8 is abutted against one side of the plastic substrate, each connecting rod 5 is inserted into a corresponding hole formed in the substrate and a metal plate 7 is press-fitted onto the end part of each connecting rod, which protrude from the other side of the substrate as shown in FIG. 7 (see, Japanese Patent Laid-Open Publn. No. 119747/1987).

However, the above-described magnetic hub has such disadvantages that it has a complicated structure and must be worked with high accuracy and hence it is expensive and that the disc substrates must be perforated in fixing the magnet hub. Therefore fixing the magnetic hub to an optical disc is difficult.

OBJECT OF THE INVENTION

It is an object of the present invention to provide a process for producing a magnetic hub which has a simple structure and is inexpensive, wherein the production of the metal plate does not require such accuracy and wherein the number of manufacturing steps can be reduced, and the metal plate can be firmly fixed to a resin body of the hub.

SUMMARY OF THE INVENTION

The present invention provides a process for producing a magnetic hub comprising an annular metal plate composed of a ferromagnetic substance and a resin body, which process comprises, positioning and setting said metal plate in a mold and then injecting a resin into the mold.

More particularly, the present invention provides a process for producing a magnetic hub for an optical disc which is fixed to the spindle of a disc drive by means of a magnet clamp system, characterized in that said magnetic hub is produced by positioning and setting an annular metal plate composed of a ferromagnetic substance in a mold and then injecting a resin into the mold.

BRIEF DESCRIPTION OF THE DRAWINGS

FIG. 5 is a cross-sectional view of a magnetic hub.

FIG. 6 is a cross-sectional view of an optical disc.

FIG. 7 is a perspective view of conventional magnetic hub components.

DETAILED DESCRIPTION OF THE INVENTION

The process for producing a magnetic hub according to the present invention will be described in more detail hereinbelow.

The magnetic hub 20 according to the present invention comprises an annular metal plate (an annular metal sheet) 12 composed of a ferromagnetic substance and a resin body 19 as shown in FIG. 5.

Figure 4:
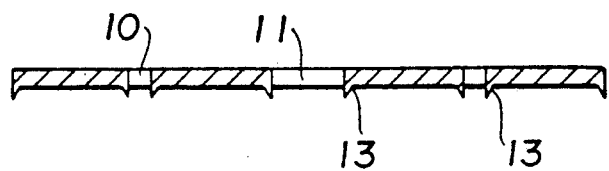
FIG. 4 illustrates an enlarged cross-sectional view taken along the line A—A in FIG. 3.

The annular metal plate 12 which can be used in the present invention can be prepared by any of conventional methods. However, it is most preferred that the metal plate 12 is prepared by means of punching with a press from a large sized metal plate. This is because a metal plate having burr 13 on the inner and outer peripheries thereof can be obtained by one step. When the metal plate 12 having burr 13 shown in FIG. 4 as formed is subjected to integral molding by an insert molding method, the metal plate 12 can be firmly fixed to the resin body 19 of the hub 20 by an anchor effect of the burr 13.

The shape of the metal plate 12 is not limited to a circle, but a circular shape is generally used. The size of the metal plate 12 is such that the inner or outer diameter thereof may be the same as the size of the hub 20, or both the inner and outer diameters thereof may be the same as those of the hub 20. However, it is desirable that the inner diameter of the metal plate 12 is slightly larger than that of the hub 20 and the outer diameter thereof is slightly smaller than that of the hub 20, because the burr 13 can be protruded from the inner and outer peripheries of the metal plate 12 toward the side direction thereof, working accuracy on the inner and outer peripheries can be moderated, the resulting molded article can be easily drawn out of a center pin 17 (see, FIG. 1) and mold release can be easily carried out. The metal plate usually has a thickness of 0.1-1 mm.

The positioning of the metal plate 12 in a mold can be made, for example, in the following manners:

(1) when the inner diameter of the hub 20 is equal to that of the metal plate 12, the metal plate 12 is fitted into the center pin 17 in the mold;

(2) when the outer diameter of the hub 20 is equal to that of the metal plate 12, the metal plate 12 is fitted into the recess of the mold 15 and 16, said recess forming a cavity 18, that is, the positioning is made by the inner and outer peripheries of the recess in the mold 15 and 16;

(3) when the inner and outer diameters of the hub 20 are equal to those of the metal plate 12, the positioning is made by the center pin 17 and the inner periphery of the recess;

(4) when the inner diameter of the metal plate 12 is larger than that of the hub 20 and the outer diameter of the metal plate 12 is smaller than that of the hub 20, a plurality of positioning pins 14 are provided in the mold 15 and each of the pins 14 is inserted into each of a plurality of small holes (for positioning) formed on the metal plate 12; and (5) the above method (4) is combined with any of the above methods (1) to (3).

Among them, the method (4) is preferred, because the positioning does not require such severe accuracy and burr may be formed in perforating the metal plate 12 to form small holes for positioning.

Figure 2:
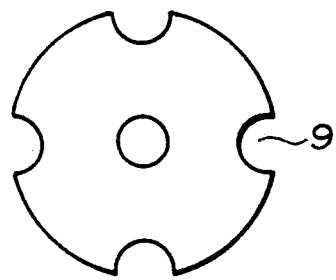
FIG. 2 is a plan view of a metal plate.
Figure 3:
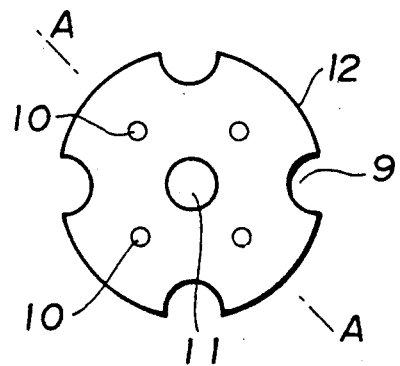
FIG. 3 is a plan view of a metal plate.

It is desirable that notches 9 are formed on the outer periphery of the metal plate 12 as shown in FIG. 2, because the metal plate 12 can be firmly fixed to the resin body 19. FIG. 3 shows an embodiment wherein a metal plate 12 having small holes 10 for positioning is provided with the notches 9.

Any of vertical and horizontal molds can be used. However, the vertical type is preferred, because the metal plate 12 can be easily fixed and is hardly slipped or displaced.

EMBODIMENT

Figure 1:
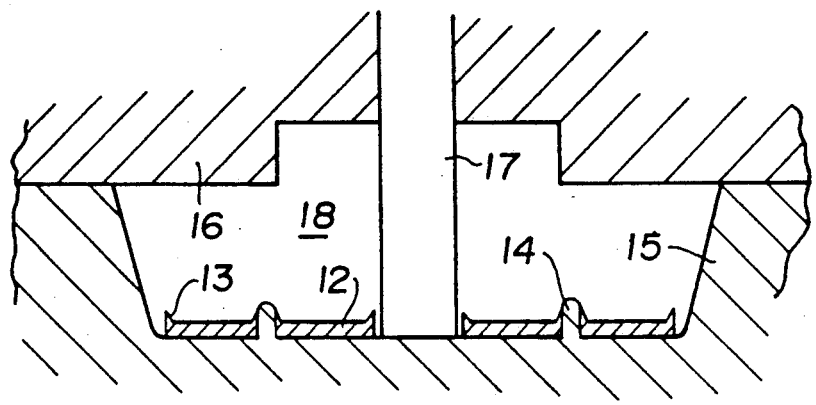
FIG. 1 is a partial cross-sectional view of a mold just before a resin is injection-molded.

A metal plate having a thickness of 0.3 mm is punched from a ferromagnetic substance to obtain an annular metal plate 12 having an axle hole 11 at the central part thereof, notches 9 on the periphery thereof, small holes 10 for positioning between notches 9 and burr 13 as formed, said burr 13 being formed on the periphery of each of the holes 10 and 11 and the notches 9, as shown in FIG. 3. The annular metal plate 12 is set in the following manner. The small holes 10 are allowed to align with the positioning pins 14 on the mold half 15 and the pins 14 are inserted into the holes 10 in such a manner that the burr 13 is positioned upward, as shown in FIG. 1. The opposite half 16 is then put thereon and clamped by conventional means. In the embodiment shown by the drawing, the mold half 16 is provided with a center pin 17, but the mold half 15 may be provided with the center pin 17. If desired, the center pin 17 may protrude from both the mold halves 15 and 16. A resin is then introduced into an cavity 18 by a injection method. Any of thermoplastic resins and thermosetting resins can be used, so long as they can be injection-molded. FIG. 5 shows a magnetic hub 20 obtained by the injection molding described above.

The magnetic hub 20 can be fixed to a disc substrate by any of conventional methods such as bonding, welding, ultrasonic welding, etc,. A magnetic hub having a long boss to be fitted in the axle of the disc substrate may be used. When such long bosses are abutted against each other and bonded to each other to join them, there is an advantage that the hub can be fixed much firmly.

The present invention has such advantages that the structure of the hub 20 is simple, the production of the metal plate 12 does not require such severe accuracy, the hub 20 can be fixed without perforating the disc substrate and the manufacturing cost of the hub 20 is low, as compared with the conventional method in which the metal plate provided with connecting rods is fixed to the perforated disc substrate.

What is claimed is:

1. A process for producing a magnetic hub for an optical disc which is fixed to a spindle of a disc drive by a magnetic clamp system, said magnetic hub having a predetermined shape including an inner diameter and an outer diameter, said process comprising providing a mold having a mold cavity of said predetermined shape and a center pin extending through a center of the mold cavity, providing a metal plate composed of ferromagnetic material, said metal plate having a first side and a second side, punching said metal plate on said first side, thereby producing an annular metal plate having said first and second sides, an axle hole extending therethrough and an outer periphery, said punching producing a burr on said second side of said annular metal plate, positioning and setting said annular metal plate in a predetermined position within said mold cavity so that said first side of said annular metal plate comes in contact with an inner surface of said mold and inserting said center pin into said axle hole of said annular metal plate, injecting a resin into said mold thereby filling said mold cavity with said resin, and recovering the molded resin from said mold cavity with said annular metal plate embedded therein.

2. The process for producing a magnetic hub as claimed in claim 1, wherein said mold is provided with a plurality of positioning pins and said punching further comprises forming a plurality of holes therethrough said annular metal plate, and wherein each of said holes corresponding to a respective one of said pins and each of said holes being receivable of said respective one of said pins for positioning of said annular metal plate in said mold cavity.

3. The process for producing a magnetic hub as claimed in claim 1, wherein said punching further comprises forming a plurality of notches in said outer periphery of said annular metal plate.

4. The process for producing a magnetic hub as claimed in claim 1, wherein said axle hole has an inner diameter, said center pin has an outer diameter and said inner diameter of said axle hole is larger than said outer diameter of said center pin.

* * * * *